US009081707B2

(12) United States Patent
Conrad et al.

(10) Patent No.: US 9,081,707 B2
(45) Date of Patent: Jul. 14, 2015

(54) APPARATUS AND METHOD FOR TRACKING TLB FLUSHES ON A PER THREAD BASIS

(71) Applicants: Shaun M. Conrad, Cornelius, OR (US); Russell J. Fenger, Beaverton, OR (US); Gaurav Khanna, Hillsboro, OR (US); Rahul Seth, Hillsboro, OR (US); James B. Crossland, Banks, OR (US); Anil Aggarwal, Portland, OR (US)

(72) Inventors: Shaun M. Conrad, Cornelius, OR (US); Russell J. Fenger, Beaverton, OR (US); Gaurav Khanna, Hillsboro, OR (US); Rahul Seth, Hillsboro, OR (US); James B. Crossland, Banks, OR (US); Anil Aggarwal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 13/730,906

(22) Filed: Dec. 29, 2012

(65) Prior Publication Data

US 2014/0189285 A1 Jul. 3, 2014

(51) Int. Cl.
*G06F 12/02* (2006.01)
*G06F 12/10* (2006.01)
*G06F 1/32* (2006.01)

(52) U.S. Cl.
CPC .......... *G06F 12/1027* (2013.01); *G06F 1/3206* (2013.01); *G06F 2212/683* (2013.01)

(58) Field of Classification Search
CPC .......................... G06F 12/1027; G06F 1/3206
USPC ........................................... 711/205; 713/320
See application file for complete search history.

(56) References Cited

U.S. PATENT DOCUMENTS

| | | | |
|---|---|---|---|
| 6,363,336 B1 | 3/2002 | Banning et al. | |
| 7,222,221 B1 * | 5/2007 | Agesen et al. | 711/141 |
| 7,783,838 B1 * | 8/2010 | Agesen et al. | 711/141 |
| 8,719,543 B2 * | 5/2014 | Kaminski et al. | 711/206 |
| 2007/0112999 A1 * | 5/2007 | Oney et al. | 711/6 |
| 2007/0113227 A1 * | 5/2007 | Oney et al. | 718/1 |
| 2008/0215848 A1 | 9/2008 | Sheu et al. | |
| 2009/0119477 A1 | 5/2009 | Plondke et al. | |
| 2012/0166852 A1 | 6/2012 | Sodhi et al. | |
| 2013/0318323 A1 * | 11/2013 | Weissmann et al. | 711/207 |

OTHER PUBLICATIONS

PCT International Search Report for PCT Counterpart Application No. PCT/US2013/046907, 3 pgs, (Oct. 18, 2013).
PCT Written Opinion of the International Searching Authority for PCT Counterpart Application No. PCT/US2013/046907, 6 pages, Oct. 18, 2013.

* cited by examiner

*Primary Examiner* — Than Nguyen
(74) *Attorney, Agent, or Firm* — Nicholson De Vos Webster & Elliot, LLP

(57) ABSTRACT

A method is described that includes recognizing that TLB information of one or more hardware threads is to be invalidated. The method also includes determining which ones of the one or more hardware threads are in a state in which TLB information is flushed. The method also includes directing a TLB shootdown to those of the or more hardware threads that are in a state in which TLB information is not flushed.

21 Claims, 8 Drawing Sheets

APPARATUS AND METHOD FOR TRACKING TLB FLUSHES ON A PER THREAD BASIS

FIELD OF INVENTION

The field of invention pertains to computing systems, and, more particularly, to an apparatus and method for tracking TLB flushes on a per thread basis.

BACKGROUND

FIG. 1 shows a portion of a multi-processor computer system 100. As observed in FIG. 1, the system includes N processors 101_1 to 101_N. An operating system (OS) 102 "runs on" the processors 101_1 to 101_N. Each of the processors includes respective translation lookaside buffer (TLB) information 103_1 to 103_N. Typically, the TLB information of each processor includes both a data TLB and an instruction TLB. As is known in the art, a TLB is a table of translations between, typically, a "virtual" memory page address called out by the OS 102 or its application software, and, the actual "physical" memory page where the called out instruction or data is actually located in system memory 104. Through manipulation of TLBs, the OS 102 is able to interweave the support of multiple applications that execute out of a common address space.

As the power consumption of computing systems has become a matter of concern, most present day systems include sophisticated power management functions. FIG. 1 shows power management software 105 integrated into the OS 102. A common framework is to define both "performance" states and "power" states for each of the processors 101_1 to 101_N. A thread executing on a processor can request that processor to enter into a specific performance state or sleep state. A processor's performance is its ability to do work over a set time period. The higher a processor's performance the more work it can do over the set time period. A processor's performance can be adjusted during runtime by changing its internal clock speeds and voltage levels. As such, a processor's power consumption increases as its performance increases.

A processor's different performance states correspond to different clock settings and internal voltage settings so as to effect a different performance vs. power consumption tradeoff. According to the Advanced Configuration and Power Interface (ACPI) standard the different performance states are labeled with different "P numbers": P0, P1, P2 . . . P_R, where, P0 represents the highest performance and power consumption state and P_R represents the lowest level of power consumption that a processor is able to perform work at. The term "R" in "P_R" represents the fact that different processors may be configured to have different numbers of performance states.

In contrast to performance states, power states are largely directed to defining different "sleep modes" of a processor. According to the ACPI standard, the C0 state is the only power state at which the processor can do work. As such, for the processor to enter any of the performance states (P0 through P_R), the processor must be in the C0 power state. When no work is to be done and the processor is to be put to sleep, the processor can be put into any of a number of different power states C1, C2 . . . C_S where each power state represents a different level of sleep and, correspondingly, a different amount of time needed to transition back to the operable C0 power state. Here, a different level of sleep means different power savings while the processor is sleeping.

A deeper level of sleep therefore corresponds to slower internal clock frequencies and/or lower internal supply voltages and/or more blocks of logic that receive a slower clock frequency and/or a lower supply voltage. Increasing C number corresponds to a deeper level of sleep. Therefore, for instance, a processor in the C2 power state might have lower internal supply voltages and more blocks of logic that are turned off than a processor in the C1 state. Because deeper power states corresponds to greater frequency and/or voltage swings and/or greater numbers of logic blocks that need to be turned on to return to the C0 state, deeper power states also take longer amounts of time to return to the C0 state.

FIGURES

The present invention is illustrated by way of example and not limitation in the figures of the accompanying drawings, in which like references indicate similar elements and in which.

DETAILED DESCRIPTION

Figure 1:
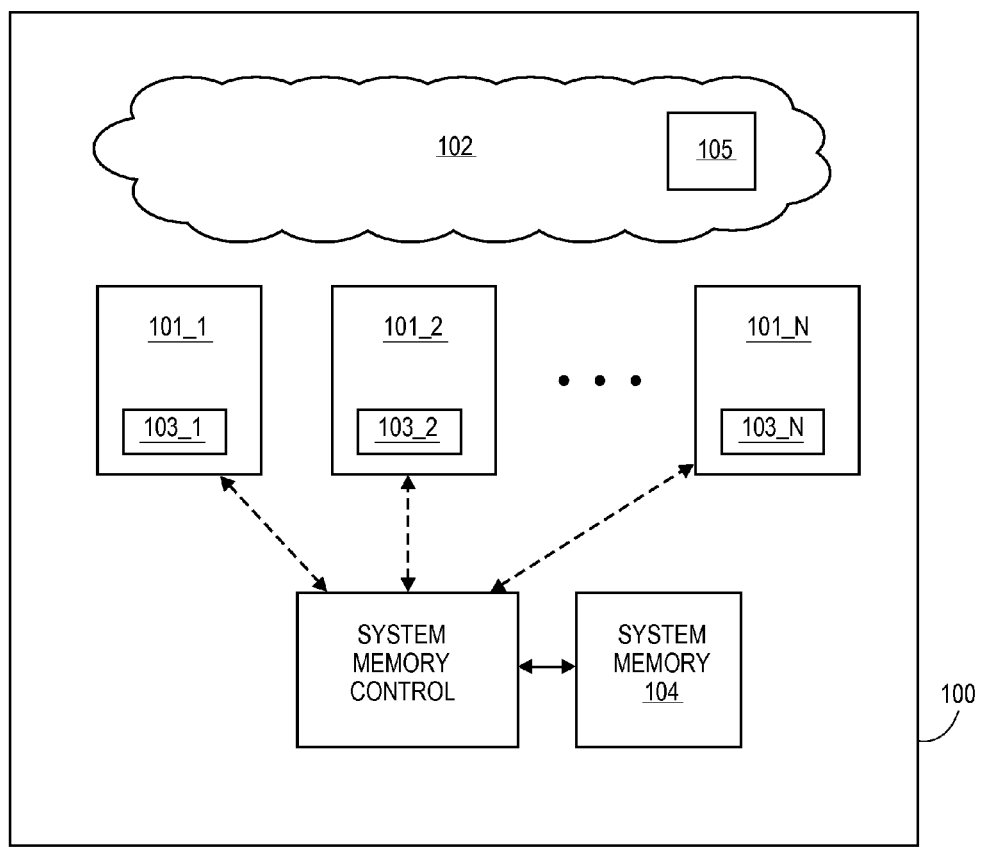
FIG. 1 shows an exemplary embodiment of a multi-processor computer system.

In a multi-processor system such as the multi-processor system 100 of FIG. 1, the OS 102 may partition the system memory 104 such that each of processors 101_1 to 101_N receives its own respective portion of system memory for private use, and, a remaining portion of system memory can be shared by two or more processors. When different processors are permitted to use the same memory space, occasionally, the memory space allocated for a first processor may effect one or more other processors in such a manner that the TLBs of the one or more other processors become invalid.

One example is the re-allocation of a region of memory from being shared by multiple processors to being protected or otherwise private for the use of a particular processor. Such a new allocation of system memory would cause any other processor that was previously configured to run out of the memory region to have invalid TLB information. That is, the TLB information of these processors would contain entries that mapped to the memory region, and, since such mapping is no longer permitted, their TLB information would have to be changed. Thus, if all other processors in the system were configured to run out of the region of memory, the OS 102 would recognize that all other processors in the system would need to have their current TLB information invalidated so they can be replaced with new TLB information that does not map to the forbidden memory region.

A "TLB Shootdown" interrupt is an interrupt provided, e.g., from the OS 102 to a processor, that causes the processor to flush its TLB information. Thus, continuing with the example above, the OS 102 would direct a TLB Shootdown interrupt to all the processors in the system that used the old mapping.

A problem is that, currently, a TLB Shootdown interrupt can be issued to a processor even if a processor has already (or is in the process of) flushing its TLB contents. For example, consider a first processor that is in the C3 state. By definition, entry into the C3 state requires the processor to flush all its internal (e.g., L1) cache information and TLB information. After the processor is placed into the C3 state, a second processor is newly allocated a protected region of memory space which adversely affects the TLB translations of the first processor.

Traditionally, this would cause the OS 102 to issue a TLB_Shootdown interrupt to the first processor (and any other processor that operated out of the memory region other than the second processor). The TLB_Shootdown interrupt awakes the first processor from its C3 state and transitions the first processor to a C0 state to handle the interrupt. The first processor would then interpret the interrupt as a command to flush its TLB contents. Since the TLB contents were already flushed from the first processor by way of its previous entry into the C3 state, the first processor does not actually need to take any action to ensure that the interrupt is properly handled.

Nevertheless, the act of waking the first processor in order to handle an interrupt that, in effect, does not need handling is wasteful in and of itself. Specifically, the computing system's overall power consumption is increased through the first core's departure from the C3 state and entry into the C0 state in order to process the unnecessary TLB_Shootdown interrupt. The wasteful power consumption scales with each processor that receives a TLB_Shootdown while in a flushed TLB state in response to the memory re-allocation.

A more efficient approach would have been for the OS 102 to recognize that the first processor had already flushed its associated TLB information and, in response, prevent issuance of the TLB_Shootdown interrupt to the first processor. This essentially lets the first processor "sleep longer" thereby making the overall system more power efficient. Again, the process can be extended to any other affected processors in the system. Here, the OS recognizes which processors are affected by the memory re-allocation so as to have invalid TLB information, and, recognizes which processors are in a sleep state that caused their TLB information to have been flushed. The OS refuses to issue a TLB_Shootdown interrupt issued to those processors meeting both criteria (and issues a TLB_Shootdown to all other processors).

Figure 2A:
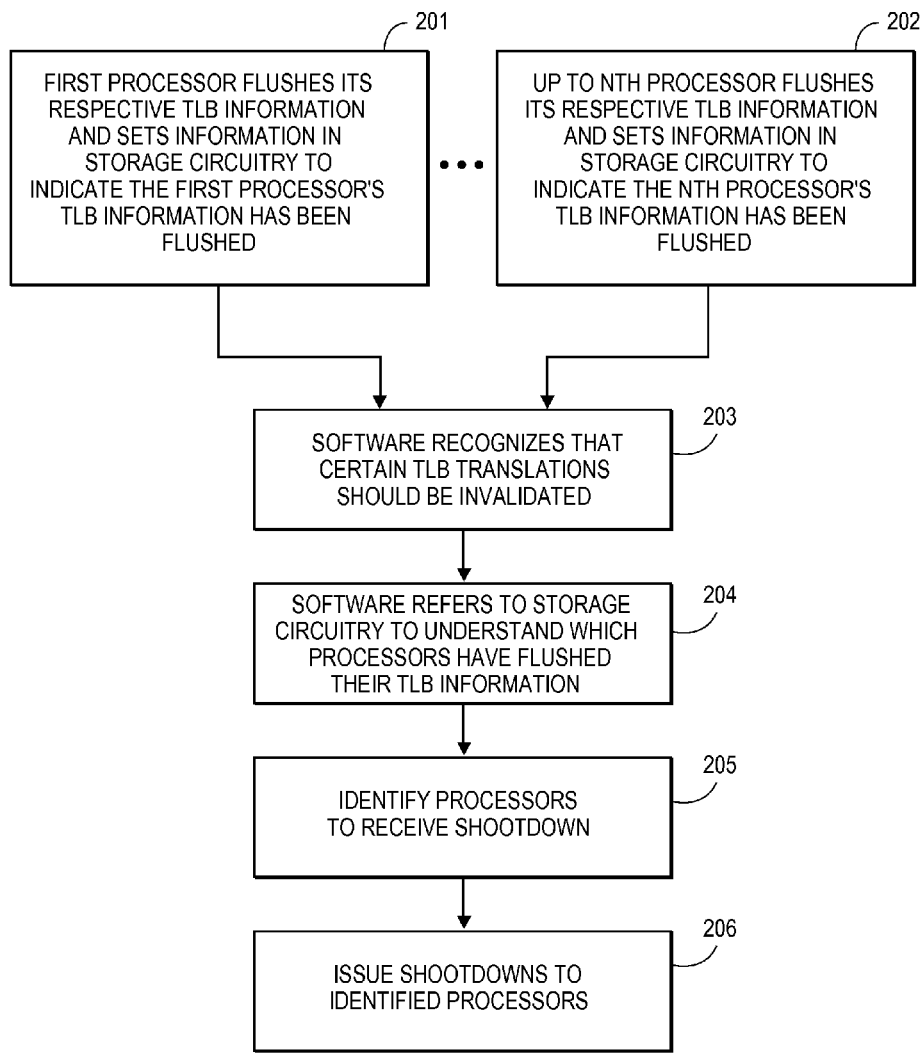
FIG. 2a shows a process to selectively issue TLB_Shootdown interrupts.

FIG. 2a shows a process, parts of which can be performed by processor hardware, other parts of which can be processed by, e.g., an OS to squelch issuance of TLB_Shootdown interrupts to a processor that has already flushed its associated TLB information by way of entry into a sleep state such as a core C3 sleep state. According to the process of FIG. 2, a thread executing on a processor requests that the processor enter a sleep state that requires the processor to flush its TLB information. In response, the processor flushes its TLB information 201 and sets information in a storage circuit (e.g., register or system memory) signifying that its associated TLB information has been flushed. Process 201 can be performed by multiple processors within the computer system 202.

Subsequently or concurrently, software such as OS, will recognize that certain currently "valid" TLB translations should be invalidated 203. As discussed above, one such situation that may cause a need to invalidate currently valid TLB translations is the allocation of a memory region to a first processor at the expense of other processors that were configured to use the same memory region. Those of ordinary skill will understand that other situations may also arise that cause the currently enabled set of TLB translations for one or more processors to be invalidated.

Upon identifying the specific processors whose TLB translations need invalidation, the OS also refers to the storage circuitry discussed above of each processor to understand which of the processors have had their TLB information flushed 204. In an embodiment, the storage circuitry is implemented as model specific register space or some other form of shadow register space. In a further embodiment, the special register space has a privilege level that the OS enjoys but not the application software.

Having identified the processors that should have their TLB information invalidated and the processors whose TLB information has been flushed, the OS determines which processors should actually receive a TLB_Shootdown interrupt 205. Specifically, the processors that are to receive a TLB_Shootdown are those threads that: 1) are to have their TLB information invalidated; and, 2) are presently not in a state in which their TLB information has already been flushed. Thus, the special register space maintained by the hardware assists the OS in filtering the set of processors that should have their TLB information invalidated to just those that have not already flushed their TLB information.

Figure 2B:
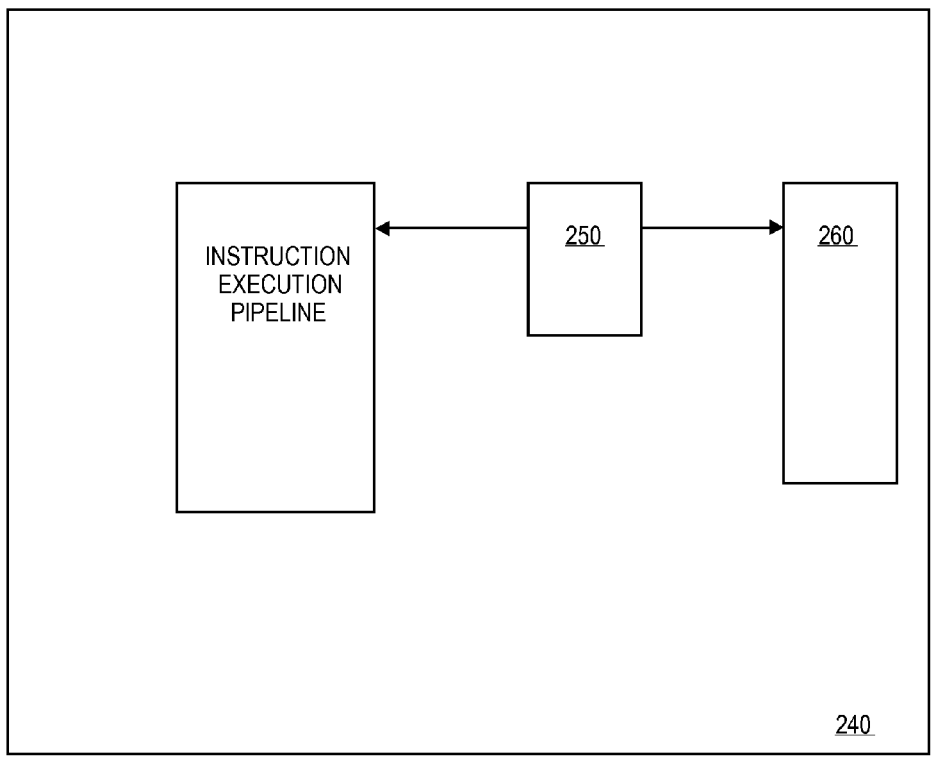
FIG. 2b shows a processor having circuitry to track TLB flushes.

After the determination 205 described just above is made, the OS issues TLB_Shootdown interrupts 206 to only those processors that should have their TLB information invalidated and whose TLB information has not been invalidated. By so-doing, those processors that should have their TLB information invalidated but have already flushed their TLB information can remain in a sleep state. After the TLB_Shootdown interrupts have been issued and successfully responded to, the OS 102 can take steps to determine appropriate address space translations for the affected processors that need new translations. In an embodiment, the OS is designed to prevent those affected processors that were not issued a TLB_Shootdown interrupt from awaking and continuing further processing. FIG. 2b shows a processor 240 having logic circuitry 250 designed to manipulate special register space 260 used to identify whether the processor has flushed its TLB information. Essentially, when the processor flushes its TLB information, e.g., as part of entering a deep sleep state, logic 250 sets a bit in register space 260 to indicate that the processor's TLB information has been flushed. The OS can refer to this bit, for example, to perform process 204 of FIG. 2a described above.

Figure 3:
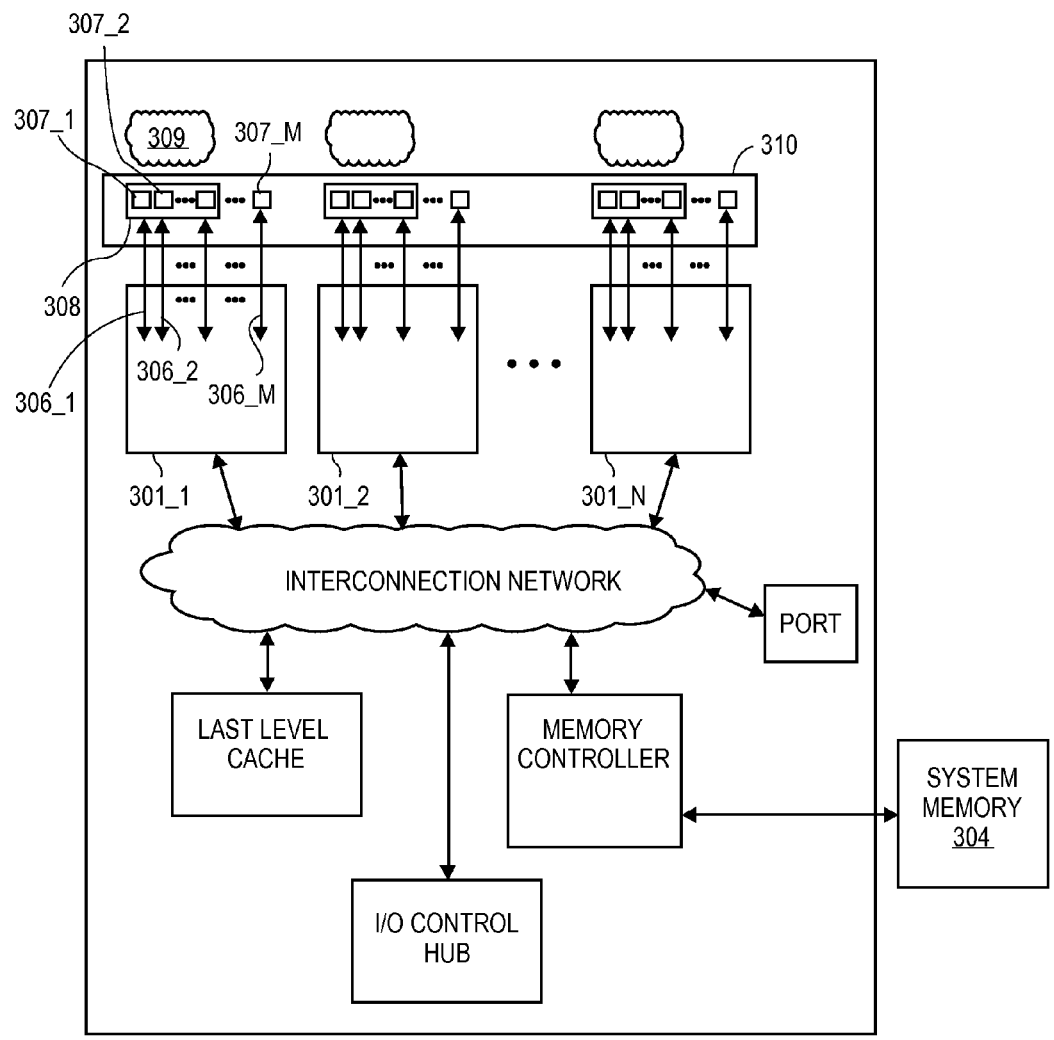
FIG. 3 shows a virtualized environment.

FIG. 3 corresponds to an extension of the teachings provided just above applied to a multicore processor 310 in a virtualization environment. Notably, the multicore processor 310 has a plurality of processing cores 301_1 through 301_N, where, each processing core is capable of simultaneously executing multiple hardware threads 306_1 to 306_M. As is known in the art, a hardware thread corresponds to a software thread whose state information and other associated information is currently loaded in a core such that the core is presently enabled to execute instructions of that thread. A software thread is a sequence of instructions belonging to a particular software process. A core is limited as to the number of hardware threads it can support. A core can conceivably support a very large number of software threads. Here, each core is configured to switch software threads between inactive and active states. When a software thread is converted to the active state, it essentially corresponds to a hardware thread until it is switched back to the inactive state. As observed in FIG. 3, at any instant of time, each hardware thread has its own associated virtual CPU 307_1 to 307_M, and, a single virtual machine 308 can contain multiple virtual CPUs in support of a single "guest" OS instance 309.

A virtual machine monitor (VMM) 310 is a layer of software that organizes and manages the virtual CPUs and virtual machines in their support of various OS guest instances. In supporting multiple guest OS instances, the VMM 310 also organizes the allocation of system memory 304 to the guest OS instances (and their corresponding applications). In so doing, the VMM 310 typically has visibility into and control over each virtual CPU's particular TLB information.

As alluded to just above, each hardware thread has its own associated TLB information and can enter deep sleep states. As such, the scheme discussed above with respect to FIGS. 2 and 3 can be applied in a virtualized environment when the processor has been allocated TLB entries for the virtual CPUs that need to be invalidated. In the case of a virtualized environment, a guest OS 309 or VMM 310 may convert a region of system memory 304 space that was previously shared amongst a plurality of virtual CPUs 307_1 through 307_L to private "protected" memory space reserved for a particular virtual CPU. Here, in the case where a guest OS 309 imposes the memory re-allocation, the guest OS 309 typically runs on the plurality of virtual CPUs 307_1 through 307_L that are implicated by the allocation. The VMM 310, having a deeper understanding of true system memory 304 allocation may be made aware of the guest OS's actions and can effect the change in actual system memory 304.

Figure 4:
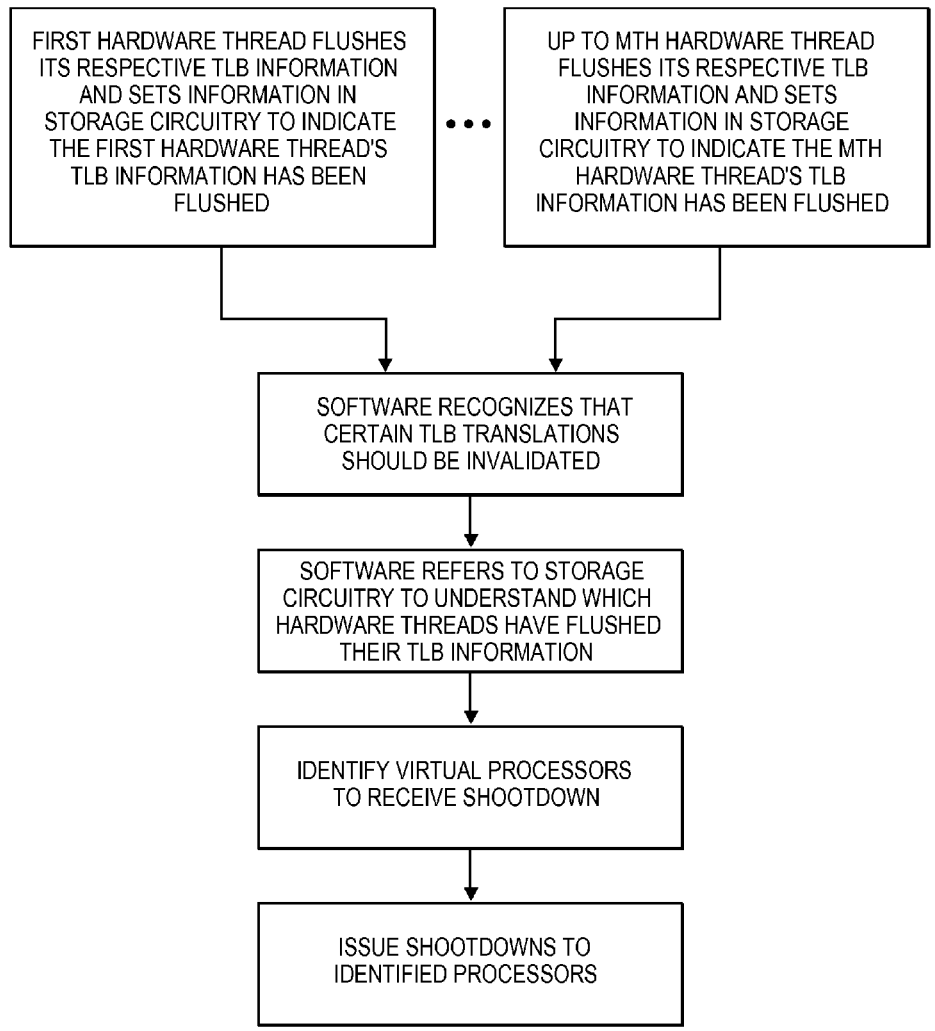
FIG. 4 shows another process to selectively issue TLB_Shootdown interrupts.

Similar to the standard multi-processor approach discussed above with respect to FIGS. 2 and 3, the virtual CPUs that are no longer permitted to use the re-allocated memory space region need to have the TLB information of their corresponding hardware threads flushed. Similar to the previous discussion, a processor that had previously run one or more virtual CPUs that require the flushing of their respective TLB information may have already entered a deep sleep state and therefore need not receive a TLB Shootdown interrupt (because their TLB information has already been flushed). FIG. 4 shows the process of FIG. 2 but re-phrased to pertain to a virtualization environment.

Figure 5:
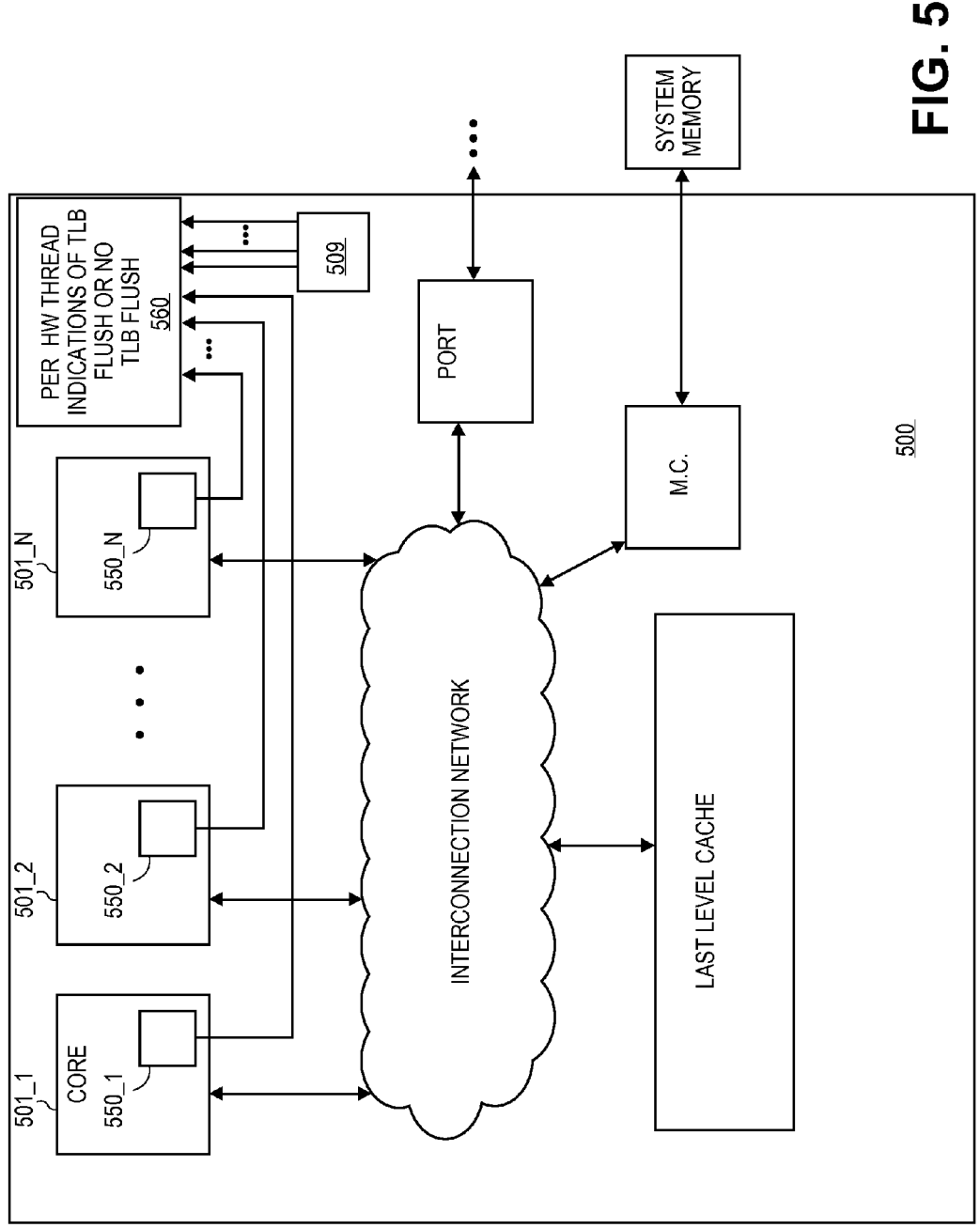
FIG. 5 shows a multi-core processor whose cores contain register space to indicate which of their hardware threads have flushed their TLB information.

FIG. 5 also shows a multi-core processor where each core 501_1 through 501_N is enhanced to include logic circuitry 550_1 through 550_N and the processor includes register space 560 for each hardware thread of each core. Again, each hardware thread can enter a sleep state that requires its virtual CPU's virtual TLB information to be flushed. Assuming a core can support a maximum of M hardware threads at any instant of time, logic circuitry 550_1 through 550_N correspondingly tracks each hardware thread of its constituent core on an individual hardware thread basis and sets information in register space 560 to indicate, on an individual hardware thread by hardware thread basis, which hardware threads have flushed their TLB information. A guest OS and/or VMM can refer to this information, consistent with the process described above in FIG. 4 to determine if a hardware thread should receive or should not receive a TLB Shootdown interrupt in response to a realization that the hardware thread's TLB information is now invalid.

Some implementation details of the logic circuitry 550, whether implemented in custom logic circuitry or micro-code or other kind of program code or a combination thereof, include: 1) in the case of setting the special register space 560 with information that a particular hardware thread has flushed its TLB information, the corresponding logic circuitry 550_1 through 550_N should confirm beforehand that the TLB is in a dormant state and no background operations such as speculatively fetching TLB translations are in process; 2) to enhance efficiency, the corresponding logic circuitry 550_1 through 550_N may analyze a hardware thread's object code stream (e.g., in an instruction fetch unit) to confirm that there are no immediate instructions that would cause TLB entries to be loaded just after being flushed. If the later case is detected, the logic circuitry 550_1 through 550_N can take the extended action to simply not set the special register space information for the hardware thread. Although FIG. 5 shows distributed hardware thread flushing tracking capability through logic circuits 550_1 through 550_N, conceivably, the same hardware thread flushing tracking may be partially or wholly centralized as represented by logic circuit 509.

Figure 6:
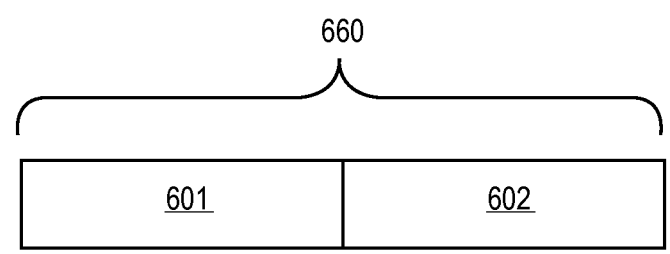
FIG. 6 shows an exemplary embodiment of the register space of FIG. 5.

FIG. 6 shows an example of the architecture of the special register space described above. According to the implementation of FIG. 6, the addressing of the special register space 660 has two components: a base address 601 and an offset address 602. The base address 601 essentially contains higher order address bits that the address of all special register bits used to indicate whether a particular hardware thread has flushed its TLB contents will have. The offset address 602 specifies the bit location where the TLB flushed status of the hardware thread is located. Thus, to determine the address for a particular hardware thread, the VMM or OS will typically increment up the proper amount from the offset address 602 and combine with the base address 601.

Figure 7:
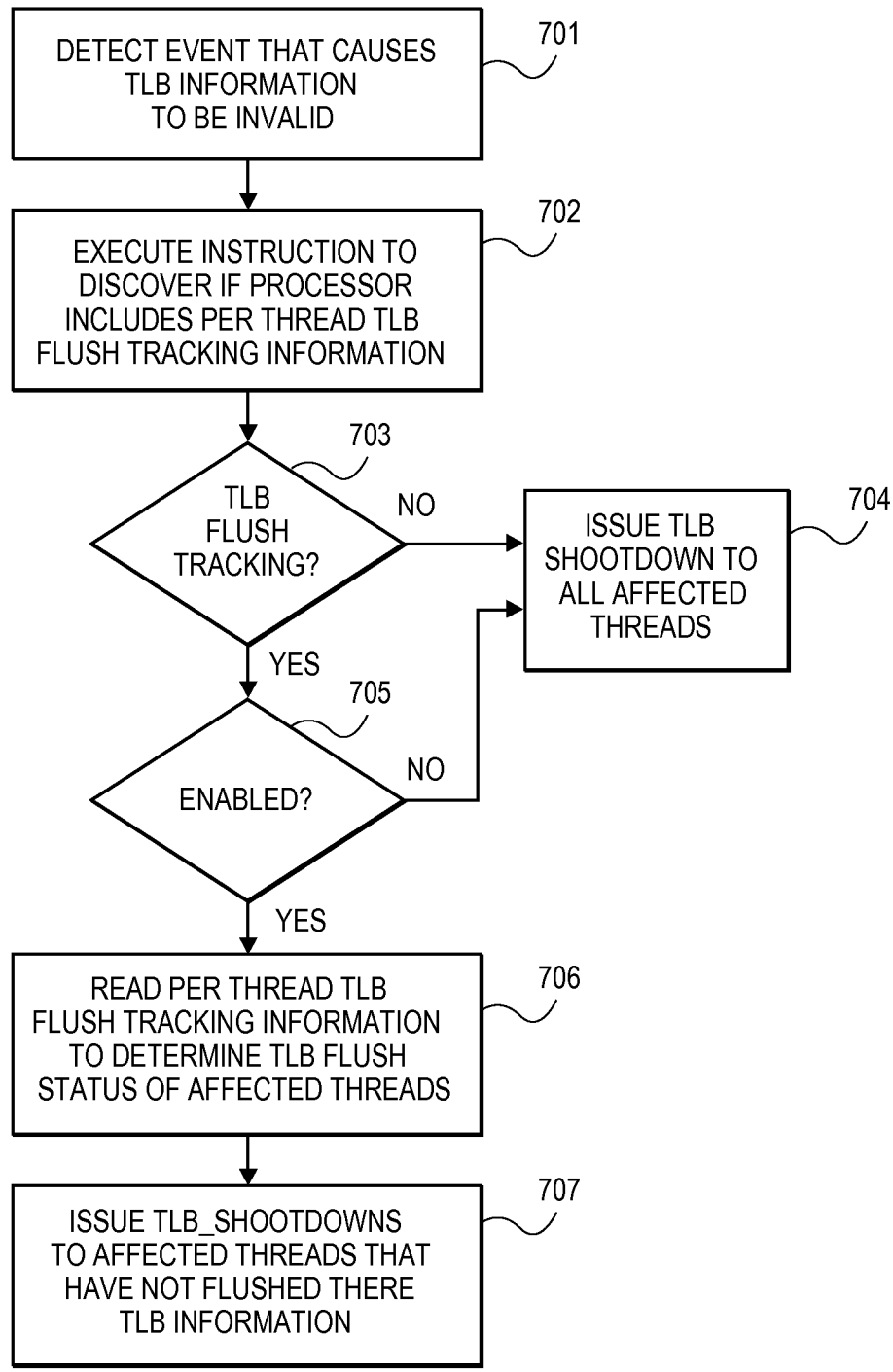
FIG. 7 shows a process that uses the register space of FIG. 5.

FIG. 7 shows a process that may be executed by software such as an OS (guest instance or otherwise) or VMM that uses the special register address space discussed above. According to the process of FIG. 7, when the OS/VMM detects an event that causes any existing TLB information of one or more hardware threads to be invalid 701, the VMM executes a CPUID instruction or similar instruction 702 to see what the capabilities of the underlying processor are. As is known in the art, execution of the CPUID instruction returns information that identifies specific capabilities of the underlying processor. After execution of the CPUID or similar instruction, the VMM will know whether or not 703 the underlying processor includes the special register space that identifies which hardware threads have flushed their TLB information. If it does not the process ends and the OS/VMM proceeds to issue TLB_Shootdown interrupts to all affected virtual CPUs without regard for their TLB flushed state status 704.

If the processor includes the functionality, the OS/VMM confirms that the feature has been enabled 705. In an embodiment, along with the special register space, additional information (e.g., a bit) is reserved in the processor's register space to specify whether the special function of tracking in the special register space which hardware threads have flushed their TLB information is enabled or not. If the function is not enabled the process ends as described just above 704. Here, it is understood that, in the case of the function being enabled, the base address, offset address and enable/disable bit are programed into register space of the processor as part of the OS/VMM's bring up routine on the processor.

If the OS/VMM discovers that the function is enabled, the VMM reads the special register space of the processor to determine the TLB flush status of all the hardware threads affected by the event causing newly invalid TLB information 706. As described above with respect to FIGS. 2 and 4, only those affected hardware threads that the special register space indicates do not presently exist with their TLB information flushed are issued a TLB_Shootdown interrupt 707. In so doing, as discussed above, the affected threads that presently exist in a state with flushed TLB information should be able to sleep longer.

An alternative implementation might execute the CPUID or similar instruction only once, e.g., upon OS/VMM bring up, to incorporate the understanding of whether the underlying processor includes the special register space into the state of the OS/VMM in a more permanent fashion (e.g., by setting a data or configuration field of the OS/VMM).

As any of the logic processes taught by the discussion above may be performed with a controller, micro-controller or similar component, such processes may be program code such as machine-executable instructions that cause a machine that executes these instructions to perform certain functions. Processes taught by the discussion above may also be performed by (in the alternative to the execution of program code or in combination with the execution of program code) by electronic circuitry designed to perform the processes (or a portion thereof).

It is believed that processes taught by the discussion above may also be described in source level program code in various object-orientated or non-object-orientated computer programming languages. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor comprising:
    first circuitry to track, on a hardware thread by hardware thread basis, whether a hardware thread is in a state in which its TLB information is to be flushed;
    second circuitry coupled to said first circuitry to provide information so that said information is visible to software, said information identifying specific hardware threads that are in a state in which their respective TLB information is to be flushed; and
    power management circuitry to place said processor in a power state that is to flush TLB information of hardware threads from the hardware threads' respective processing core.

2. The processor of claim 1 wherein said second circuitry includes a register space on said processor.

3. The processor of claim 2 wherein said register space is a model specific register space.

4. The processor of claim 3 wherein said processor includes additional register space to identify a base address and an offset address of said model specific register space.

5. The processor of claim 1 wherein said first circuitry resides in a processing core of said processor, said hardware threads supported by said processing core.

6. A method comprising:
    placing a processor in a power state that is to flush TLB information of hardware threads from the hardware threads' respective processing core;
    determining which ones of said hardware threads are in a state in which TLB information is to be flushed;
    providing information so that said information is visible to software, said information identifying specific hardware threads that are in a state in which their respective TLB information is to be flushed; and
    directing a TLB shootdown signal to those of said hardware threads that are in a state in which TLB information is to not be flushed.

7. The method of claim 6 wherein said determining includes referring to a register space of a processor supporting said hardware threads.

8. The method of claim 7 wherein said register space is a model specific register space.

9. The method of claim 7 wherein said method further comprises referring to a second register space to determine an address of said register space.

10. The method of claim 6 further comprising, in response to said placing, executing an instruction to determine if an underlying processor includes functionality to provide information identifying which of its supported hardware threads are in a state in which TLB information is to be flushed.

11. The method of claim 6 further comprising referring to information that indicates whether an underlying processor's functionality to provide information identifying which of its supported hardware threads are in a state in which TLB information is to be flushed is enabled.

12. A non-transitory computer readable storage medium containing program code that when processed by one or more processors of a computer causes a method to be performed, the method comprising:
    placing a processor in a power state that is to flush TLB information of hardware threads from the hardware threads' respective processing core;
    determining which ones of said hardware threads are in a state in which TLB information is to be flushed;
    providing information so that said information is visible to software, said information identifying specific hardware threads that are in a state in which their respective TLB information is to be flushed; and
    directing a TLB shootdown signal to those of said hardware threads that are in a state in which TLB information is to not be flushed.

13. The non-transitory computer readable storage medium of claim 12 wherein said determining includes referring to a register space of a processor supporting said hardware threads.

14. The non-transitory computer readable storage medium of claim 13 wherein said register space is a model specific register space.

15. The non-transitory computer readable storage medium of claim 13 wherein said method further comprises referring to a second register space to determine an address of said register space.

16. The non-transitory computer readable storage medium of claim 12 further comprising, in response to said placing, executing an instruction to determine if an underlying processor includes functionality to provide information identifying which of its supported hardware threads are in a state in which TLB information is to be flushed.

17. The non-transitory computer readable storage medium of claim 12 further comprising referring to information that indicates whether an underlying processor's functionality to provide information identifying which of its supported hardware threads are in a state in which TLB information is to be flushed is enabled.

18. The non-transitory computer readable storage medium of claim 13 wherein said program code is part of a virtual machine monitor's (VMM's) program code.

19. A computing system comprising:
a non-transitory storage medium containing stored program code, said stored program code to execute a method comprising:
- placing a processor in a power state that is to flush TLB information of hardware threads from the hardware threads' respective processing core;
- determining which ones of said hardware threads are in a state in which TLB information is to be flushed;
- providing information so that said information is visible to software, said information identifying specific hardware threads that are in a state in which their respective TLB information is to be flushed; and
- directing a TLB shootdown signal to those of said one or more hardware threads that are in a state in which TLB information is to not be flushed and the processor having a processing core, said processing core having:
- circuitry to provide information to said method, said information identifying which of said hardware threads are to have their respective TLB information flushed; and
- power management circuitry to place said processor in the power state that is to flush TLB information of hardware threads from the hardware threads' respective processing core.

20. The computing system of claim 19 wherein said circuitry includes a register space on said processor.

21. The computing system of claim 19 wherein said processor implements active and inactive states for hardware threads.

* * * * *